(12) United States Patent
Kim et al.

(10) Patent No.: US 8,576,178 B2
(45) Date of Patent: Nov. 5, 2013

(54) MOBILE COMMUNICATION TERMINAL HAVING TOUCH SCREEN AND METHOD OF CONTROLLING DISPLAY THEREOF

(75) Inventors: Moon Ju Kim, Seoul (KR); Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1447 days.

(21) Appl. No.: 12/189,999

(22) Filed: Aug. 12, 2008

(65) Prior Publication Data

US 2009/0046075 A1 Feb. 19, 2009

(30) Foreign Application Priority Data

Aug. 16, 2007 (KR) ........................ 10-2007-0082416

(51) Int. Cl.
G06F 3/041 (2006.01)
H04N 7/14 (2006.01)

(52) U.S. Cl.
USPC ........ 345/173; 345/156; 345/169; 348/14.01; 348/14.03; 348/14.07; 715/788; 715/798; 715/799; 715/800

(58) Field of Classification Search
USPC ............ 345/156, 169, 173; 348/14.01, 14.03, 348/14.07; 715/788–789, 798–800
See application file for complete search history.

(56) References Cited

U.S. PATENT DOCUMENTS

| 5,148,275 | A   | * | 9/1992  | Blatter et al. ................ 348/567 |
| 5,382,972 | A   | * | 1/1995  | Kannes ...................... 348/14.07 |
| 5,767,897 | A   | * | 6/1998  | Howell ....................... 348/14.07 |
| 6,262,769 | B1  | * | 7/2001  | Anderson et al. .......... 348/333.1 |
| 6,958,749 | B1  | * | 10/2005 | Matsushita et al. .......... 345/175 |
| 6,999,124 | B2  | * | 2/2006  | Woodworth ............ 348/333.01 |
| 7,206,029 | B2  | * | 4/2007  | Cohen-Solal ................ 348/565 |
| 7,283,104 | B2  | * | 10/2007 | Kim et al. ........................ 345/9 |
| 7,348,998 | B2  | * | 3/2008  | Belz .............................. 345/649 |
| 7,487,210 | B2  | * | 2/2009  | Ludwig et al. ............... 709/204 |
| 7,515,193 | B2  | * | 4/2009  | Honda ....................... 348/333.05 |
| 7,605,796 | B2  | * | 10/2009 | Kaminaga ..................... 345/104 |
| 7,663,700 | B2  | * | 2/2010  | Yuen et al. .................... 348/569 |
| 7,814,421 | B2  | * | 10/2010 | Reynolds et al. ............. 715/716 |
| 8,044,939 | B2  | * | 10/2011 | Park .............................. 345/173 |
| 8,049,678 | B2  | * | 11/2011 | Lee et al. ....................... 345/1.1 |
| 2003/0184525 | A1 | * | 10/2003 | Tsai ............................... 345/173 |
| 2004/0109201 | A1 | * | 6/2004  | Teraue ......................... 358/1.18 |
| 2006/0244815 | A1 | * | 11/2006 | Barreiro .................... 348/14.07 |
| 2007/0268271 | A1 | * | 11/2007 | Kinjo ............................ 345/173 |
| 2008/0003985 | A1 | * | 1/2008  | Jung et al. ................... 455/414.1 |
| 2008/0123138 | A1 | * | 5/2008  | Banerjee et al. ............. 358/1.18 |
| 2008/0129816 | A1 | * | 6/2008  | Mattila et al. .............. 348/14.08 |

* cited by examiner

Primary Examiner — William Boddie
Assistant Examiner — Alecia D English
(74) Attorney, Agent, or Firm — Birch, Stewart, Kolasch & Birch, LLP

(57) ABSTRACT

A mobile communication terminal is provided. The mobile communication terminal includes a communication module for transmitting and receiving data in order to perform audio-visual communication with at least one other party's terminal; a camera module for photographing an image; a touch screen for displaying a first image received from the at least one other party's terminal and a second image acquired from the camera module; and a controller for changing, when the first image or the second image displayed on the touch screen is touched, a display manner of the first image and the second image.

26 Claims, 19 Drawing Sheets

MOBILE COMMUNICATION TERMINAL HAVING TOUCH SCREEN AND METHOD OF CONTROLLING DISPLAY THEREOF

CROSS REFERENCE TO RELATED APPLICATIONS

This application claims priority under 35 U.S.C. §119(a) on Patent Application No. 10-2007-0082416 filed in Republic of Korea on Aug. 16, 2007, the entire contents of which are hereby incorporated by reference.

BACKGROUND OF THE INVENTION

1. Field of the Invention

This document relates to a mobile communication terminal having a touch screen and a method of controlling a display thereof.

2. Description of the Related Art

Nowadays, according to a multimedia service such as audiovisual communication or a video information service according to technical development and a next generation mobile communication service is introduced, a mobile communication terminal uses a display having a size as large as possible in order to display an image thereof.

Particularly, in order to satisfy a request for a large display while decreasing a size of the mobile communication terminal in consideration of mobility, the mobile communication terminal has used a touch screen that can perform both a display function and an input function.

However, in the mobile communication terminal, a method of efficiently controlling a display in consideration of characteristics of a touch screen has not been provided.

SUMMARY OF THE INVENTION

An aspect of this document is to provide a mobile communication terminal, computer program product and a method of controlling a display thereof that can efficiently control a display using a touch screen.

In one general aspect, a mobile communication terminal comprises: a communication module for transmitting and receiving data in order to perform audiovisual communication with at least one another party's terminal; a camera module for photographing an image; a touch screen for displaying a first image received from the at least one another party's terminal and a second image acquired from the camera module; and a controller for changing, when the first image or the second image displayed on the touch screen is touched, a display manner of the first image and the second image.

The display manner may comprise at least one of a display position, size, and direction.

The controller may control, when an image having a smaller display size among the first image and the second image is touched, to enlarge a size of a touched image by a size of the remaining image and to reduce a size of the remaining image by a size of the touched image.

The controller may control to exchange a position of the touched image for that of the remaining image and to display the images.

The controller may control, when an image having a larger display size between the first image and the second image is touched, to change a display direction of the touched image.

The changed display direction may be a direction rotated by 90° clockwise or counterclockwise.

The controller may control to enlarge and display the touched image so that at least one of edges of a horizontal direction or a vertical direction of the touched image according to the direction change agrees with an edge of a horizontal direction or a vertical direction of the touch screen.

The controller may control to reduce and display the remaining image not to be overlapped with an enlarged and displayed image by touching.

The controller may control to display the remaining image with a Picture In Picture (PIP) method within an enlarged and displayed image by touching.

The controller may control to display a menu key for displaying at least one icon for executing specific functions on the touch screen to be not overlapped with the enlarged and displayed image and to display, when the menu key is touched, the at least one icon to be overlapped with a part of the enlarged and displayed image.

The controller may control, when the enlarged and displayed image is again touched, to return the touched image and the remaining image to a previous display state.

The controller may control to display a menu key for returning the enlarged and displayed image to a previous display state to be not overlapped with the enlarged and displayed image and to return, when the menu key is touched, the enlarged and displayed image and the remaining image to a previous display state.

The controller may control, when the display direction is changed, to display a use guide according to the direction change on the touch screen for a preset time period.

The controller may control to display a third image stored in the mobile communication terminal on the touch screen and to display, when the third image is touched, the third image by replacing with the second image.

The controller may control, when the third image replacing the second image is touched, to change at least one of a display position, size, and direction of the first image to the third image.

The second image may be displayed in a position in which the third image was previously displayed.

The controller may control, when the second image displaying in a position in which the third image was previously displayed is touched, to return and display the exchanged and displayed second image and third image to a previous display state.

The input method may be to touch the first image or the second image by a preset number of times.

The input method may be to touch and drag the first image or the second image.

The input method may be to touch and drag a preset area of the first image or the second image, and the controller may control to change a display size of the first image and the second image according to the drag.

In another aspect, a method of controlling a display for audiovisual communication with at least one another party's terminal in a mobile communication terminal for providing an audiovisual communication service by comprising a touch screen and a camera module, comprises: displaying a first image received from the at least one another party's terminal on the touch screen; and displaying a second image acquired from the camera module on the touch screen, wherein a display manner of the first image and the second image is changed when the first image, or the second image is touched.

The method may be implemented with software written on a computer readable recording medium.

BRIEF DESCRIPTION OF THE DRAWINGS

The details of one or more implementations are set forth in the accompanying drawings and the description below. In the FIG. 1 is a block diagram of a mobile communication terminal in an implementation.

DETAILED DESCRIPTION OF THE INVENTION

Figure 1:
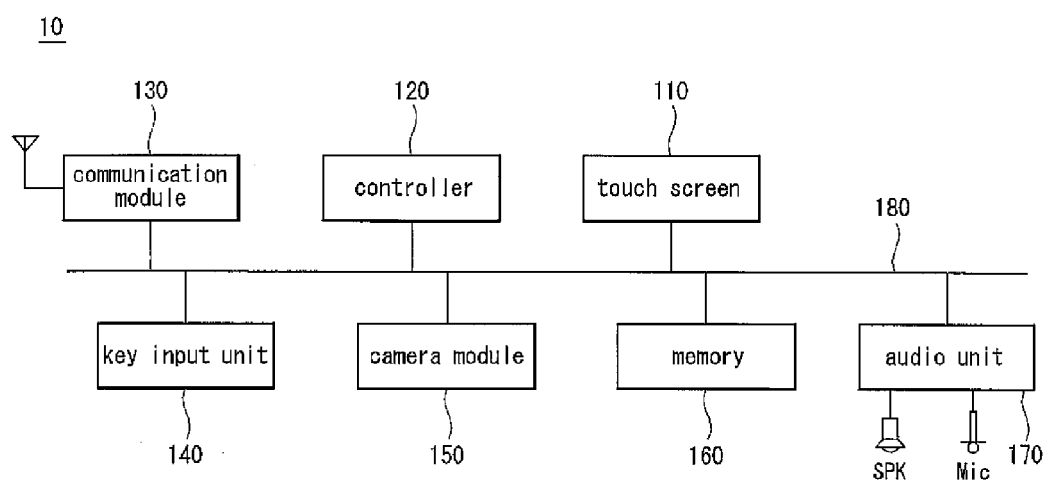

These and other objects of this document will become more readily apparent from the detailed description given hereinafter. Hereinafter, implementations will be described in detail with reference to the accompanying drawings. Like reference numerals designate like elements throughout the specification. Further, when it is judged that a detailed description about a known function or configuration related to this document makes unclear a gist of this document, the detailed description thereof is omitted.

FIG. 1 is a block diagram of a mobile communication terminal in an implementation. Referring to FIG. 1, the mobile communication terminal is described in detail.

A mobile communication terminal 10 in an implementation of this document comprises a touch screen 110, a controller 120, a communication module 130, a key input unit 140, a camera module 150, and a memory 160.

The constituent elements are connected by a bus 180, however a connection element of the constituent elements is not limited thereto, and a part or all of the constituent elements may be connected by an exclusive line thereof.

The mobile communication terminal 10 can be applied to various type terminals such as a bar type terminal, a folder type terminal, and a slide type terminal.

The touch screen 110 is a display device for displaying a state or various information of the mobile communication terminal by a control signal output from the controller and uses, for example a Liquid Crystal Display (LCD). Further, the touch screen 110 can simultaneously perform an input function for receiving various information or instructions from a user with a touch method.

The controller 120 controls various constituent elements of the mobile communication terminal 10 and controls general operations of the mobile communication terminal 10. The controller 120 is also used as a processor.

The communication module 130 transmits and receives sound and image data by interfacing a communication network and the controller 120 and performs a communication function such as audio dedicated/audiovisual communication and message transmission and reception in the mobile communication terminal 10.

The communication network comprises a line switching network and a packet switching network and comprises an IP-based network according to a next generation mobile communication standard such as the 3rd Generation Partnership Project (3GPP), thereby providing a communication path required for receiving an audiovisual communication service, instant message service, and various session-based multimedia services as well as an audio dedicated communication service in the mobile communication terminal 10.

The key input unit 140 is a device for receiving various information or instructions from the user and comprises an input device such as a keypad comprising various numeric keys, a direction key, and a function key.

The camera module 150 comprises an image forming element such as a Charge Coupled Device (CCD) sensor and uses a digital still video camera that can photograph a still picture and a moving picture. A CCD of the camera module 150 converts an optical signal of a subject to an electrical signal (image forming signal) and applies the converted signal to the controller 120. The camera module 150 may use a complementary Metal Oxide Semiconductor sensor (CMOS) chip, instead of the CCD. The camera module 150 may use a plurality of camera modules.

The memory 160 comprises a non-volatile memory for storing a program and data required for performing various functions providing in the mobile communication terminal 10 and a volatile memory for temporarily storing various data generating according to operation of the mobile communication terminal 10.

Particularly, the memory 160 stores various programs necessary for displaying various data comprising text and image information on the touch screen 110 with a preset method in the non-volatile memory in order to provide an audiovisual communication service of the mobile communication terminal 10.

Further, the mobile communication terminal 10 further comprises an audio unit 170 for processing a sound signal that is input/output in the mobile communication terminal 10, a speaker SPK connected to the audio unit 170 to output a sound signal processed in the audio unit 170, and a microphone (MIC) for converting a sound from the outside to a sound signal and inputting the sound signal to the audio unit 170. The speaker SPK may use a plurality of speakers comprising an external speaker.

Referring to FIG. 1, a method of controlling a display of audiovisual communication to be performed in the mobile communication terminal 10 is described hereinafter. Hereinafter, audiovisual communication comprises a video conference in which three or more persons participate at the same time and a case in which one user individually performs much audiovisual communication with each of many other parties' terminals.

Figure 2A:
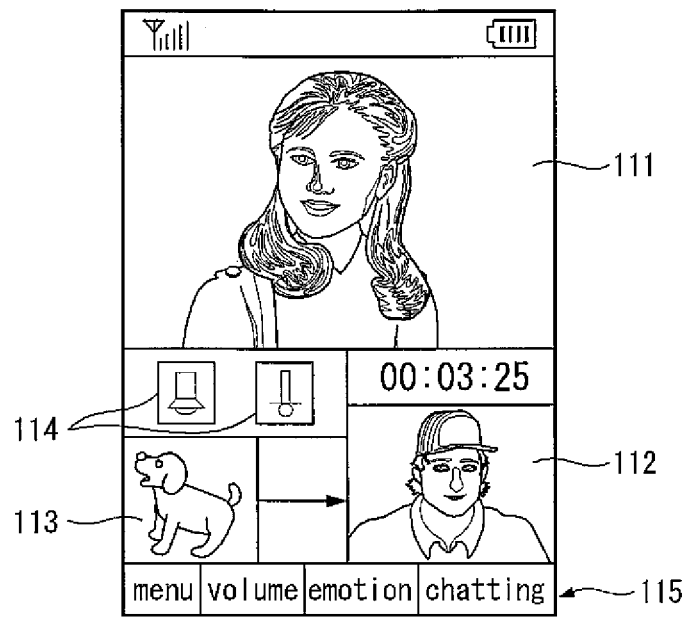
FIGS. 2a and 2b are diagrams illustrating a method of controlling a display of a mobile communication terminal in an implementation.
Figure 2B:
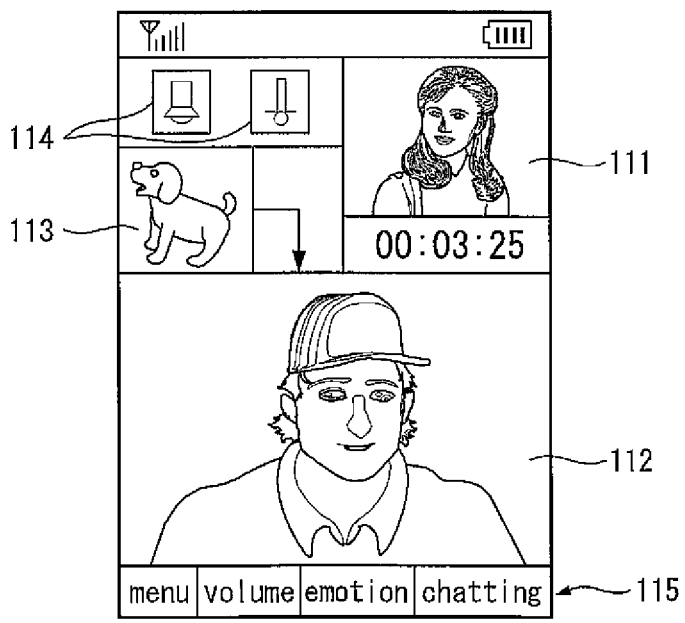

FIGS. 2a and 2b illustrate an example of a screen for providing an audiovisual communication service displayed on the touch screen 110 of the mobile communication terminal 10 according to a method of controlling a display for audiovisual communication of a mobile communication terminal in an implementation.

When the user sets a call to perform audiovisual communication or a request for a call from another party's terminal is received, the controller 120 controls to display an another party image 111 received from the other party's terminal through the communication module 130 on the touch screen 110, for example in an upper part thereof and to display a user image 112 acquired from the camera module 150 on the touch screen 110, for example at the right side of a lower part thereof by controlling the camera module 150.

Further, the controller 120 controls to display the user image 112 acquired from the camera module 150 on the touch screen 110 and to transmit the user image 112 to the other party's terminal through the communication module 130.

The controller 120 controls to display icons 114 for displaying a menu for controlling audiovisual communication such as an icon of a microphone shape and an icon of a speaker shape for displaying a menu for intercepting a transmission sound of audiovisual communication and a menu for intercepting the output of a speaker for outputting a reception sound of audiovisual communication in an upper part of a left space of the user image 112 and to display, for example a replacement image 113 that can be transmitted to the other party's terminal by replacing the user image 112 as one of images stored in the memory 160 in a lower part of the icons 114.

The controller 120 controls to display various soft keys 115 for using as a hotkey matched to perform a specific function providing in the mobile communication terminal 10 at a lower end of the touch screen 110.

Further, the controller 120 controls to display information about a duration time of audiovisual communication on the touch screen 110, for example in a space between the other party image 111 and the user image 112 on the touch screen 110.

Therefore, the user can control environment of the mobile communication terminal 10 using displayed icons and soft key and perform audiovisual communication while viewing another party image 111, his own image, and information related to audiovisual communication.

FIG. 2b shows a changed and displayed screen when the user touches the user image 112 displayed with a small size on a screen of FIG. 2a.

On the screen shown in FIG. 2a, when the user touches the user image 112, the controller 120 controls to enlarge and display a size of the user image 112 and to reduce and display a size of the other party image 111. Therefore, the user image 112 is changed to a size larger than that of the other party image 111.

In this case, a touched image of a smaller size is enlarged by a relatively larger size of the remaining image, and a size of the remaining image is reduced by a size of the touched image. Further, this document is not limited thereto, as one of the images is touched, and a display manner such as a size, position, and direction in which the images are displayed can be changed.

Further, in another implementation of this document, when one of the images is touched, in addition to a change of a display manner of an image itself, and various applications related to the touched image such as recording of the touched image, pop-up of information related to the touched image, or display of a screen for providing a list of processing methods of the touched image may be executed.

Figure 3A:
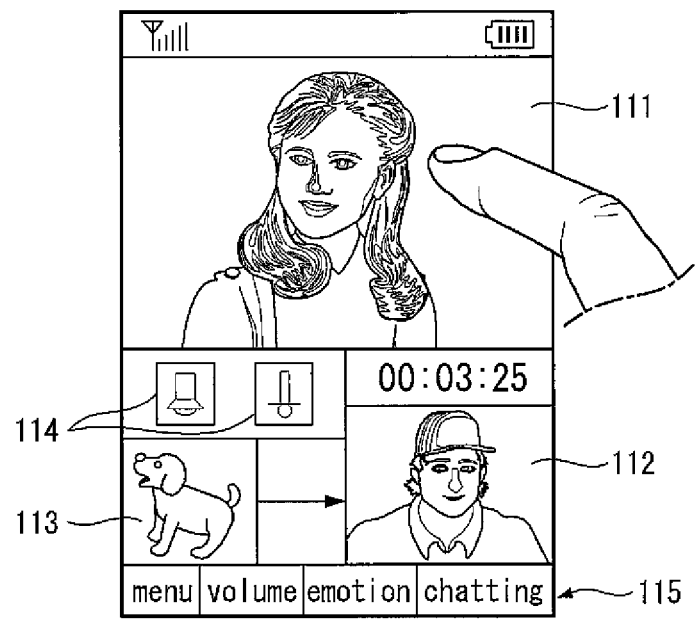
FIGS. 3a to 3c are diagrams illustrating a method of controlling a display of a mobile communication terminal in another implementation.
Figure 3B:
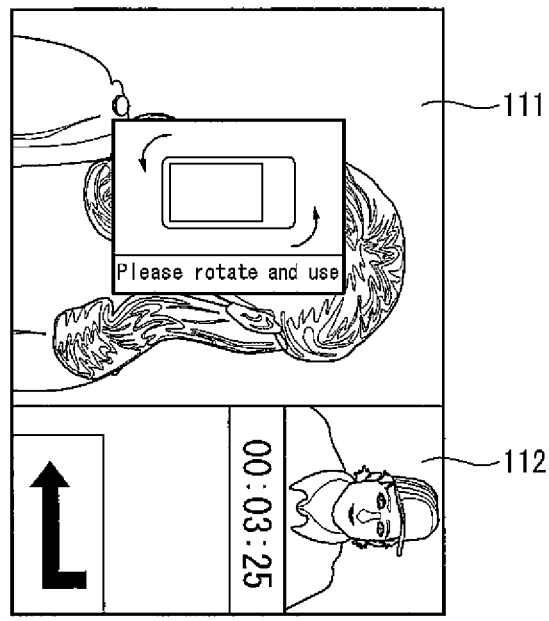
Figure 3C:
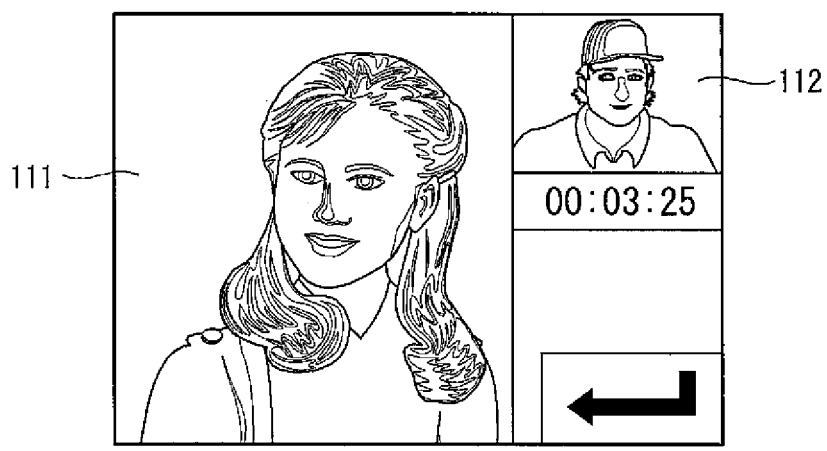

FIGS. 3a to 3c are diagrams illustrating a method of controlling a display of a mobile communication terminal in another implementation.

Referring to FIG. 3a, when the user touches the other party image 111 displayed to be relatively larger than the user image 112, while the other party image 111 is enlarged, a display form of the touch screen 110 is changed to a full screen display form of a horizontal direction, as shown in FIG. 3b.

That is, in an implementation of this document, according to touch input of the user, a display position as well as a size of the other party image 111 can be changed, and a direction, or a direction and a size in which the user image 112 is displayed can be changed together with the other party image 111.

In a case of FIG. 3b, as a display direction of the other party image 111 and the user image 112 is changed, the user should change a using direction of the mobile communication terminal 10 from a vertical direction to a horizontal direction, whereby the controller 120 controls to display a use guide having, for example a content of rotating and using the mobile communication terminal 10 on the touch screen 110, for example in a pop-up window form for a predetermined time period.

Accordingly, the user can perform audiovisual communication while viewing a screen in a form shown in FIG. 3c by rotating the mobile communication terminal 10 that has been used in a vertical direction to a horizontal direction.

FIGS. 4a to 4h are diagrams illustrating a method of controlling a display of a mobile communication terminal in another implementation.

Figure 4A:
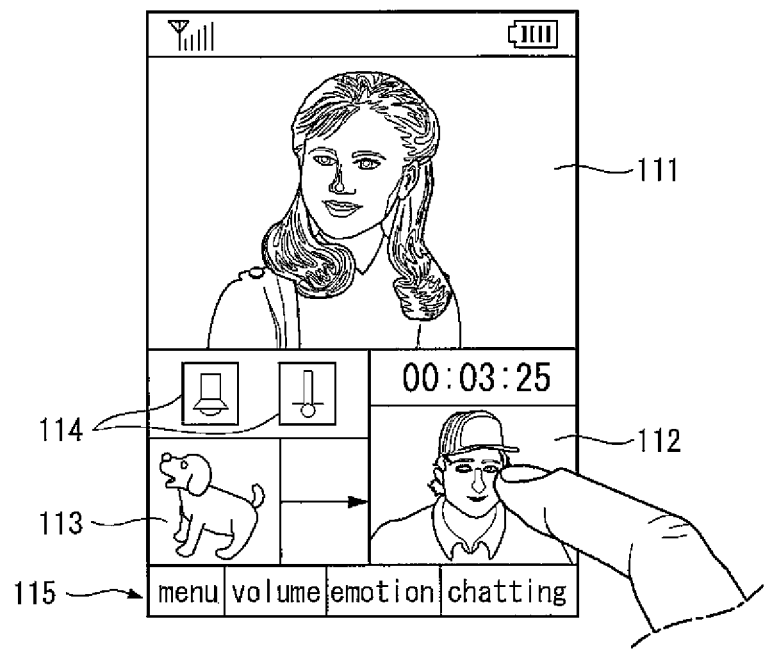
FIGS. 4a to 4h are diagrams illustrating a method of controlling a display of a mobile communication terminal in another implementation.
Figure 4B:
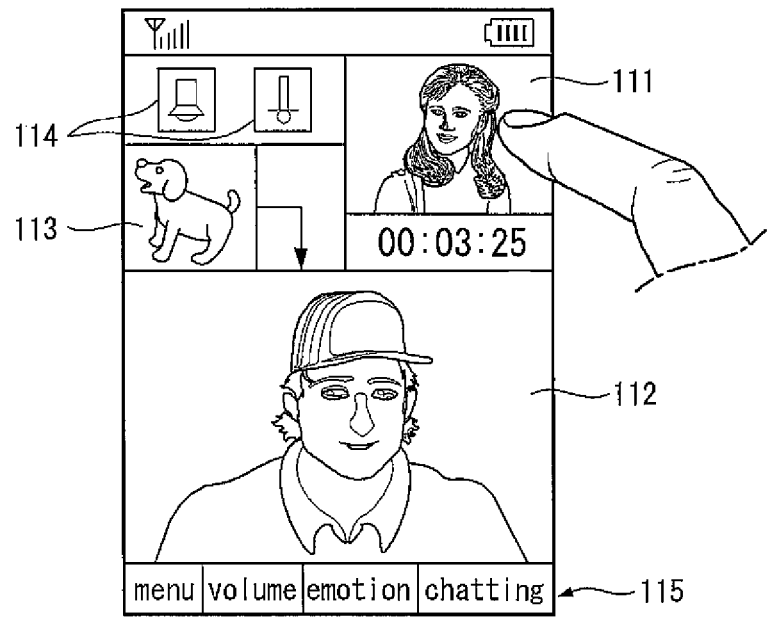

Referring to FIG. 4a, when the user touches the user image 112, the controller 120 controls to enlarge and display a size of the user image 112 and to reduce and display a size of the other party image 111, as shown in FIG. 4b. Therefore, the user image 112 is changed to a size larger than that of the other party image 111.

In this case, the touched image of a small size is enlarged and displayed by a size of the remaining image, and a size of the remaining image is reduced and displayed by that of the touched image. However, this document is not limited thereto, when one of the images are touched, a display position of the displayed images may be changed, not a size thereof.

Figure 4C:
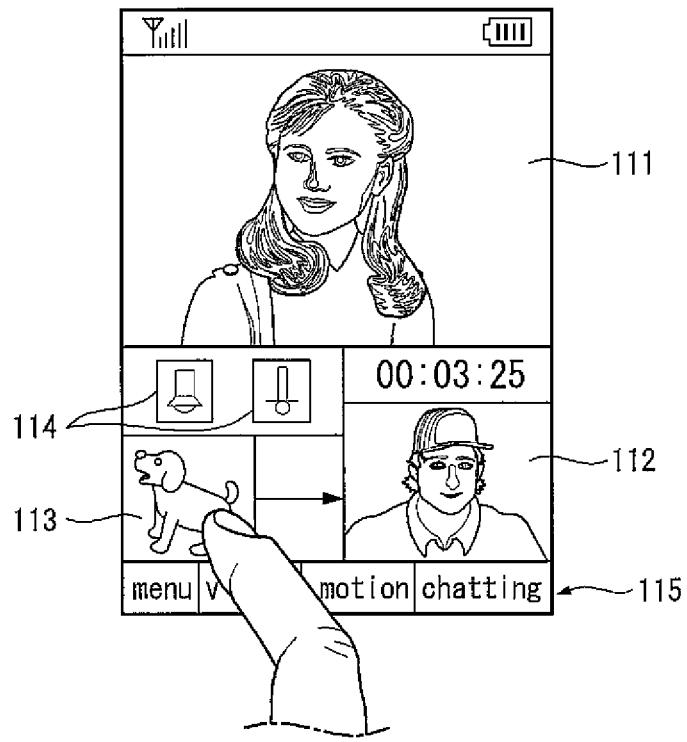

Further, on a screen shown in FIG. 4b, when the user touches the other party image 111 whose size is changed and displayed to be small, a size of the other party image 111 is changed to that of the user image 112 as in a previous display size, and a size of the user image 112 is changed to a small size as in a previous display size, whereby a screen of FIG. 4c is displayed.

Figure 4D:
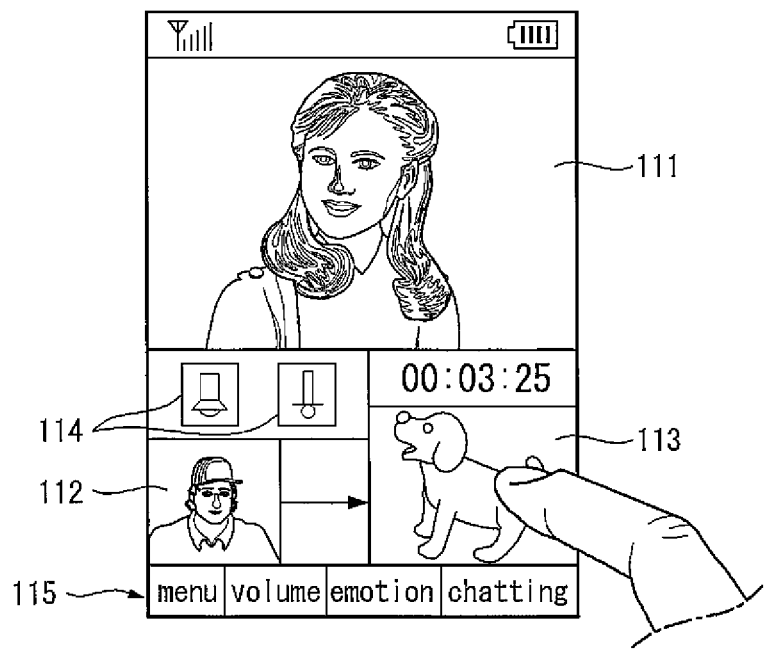

On a screen shown in FIG. 4c, when the user touches the replacement image 113, the replacement image 113 is displayed in an area in which the user image 112 is displayed, as shown in FIG. 4d. In this case, the controller 120 controls to transmit the replacement image 113, instead of the user image 112 to the other party terminal.

That is, when the replacement image 113 is touched, a position and a size of the replacement image 113 and the user image 112 are exchanged and displayed.

Figure 4E:
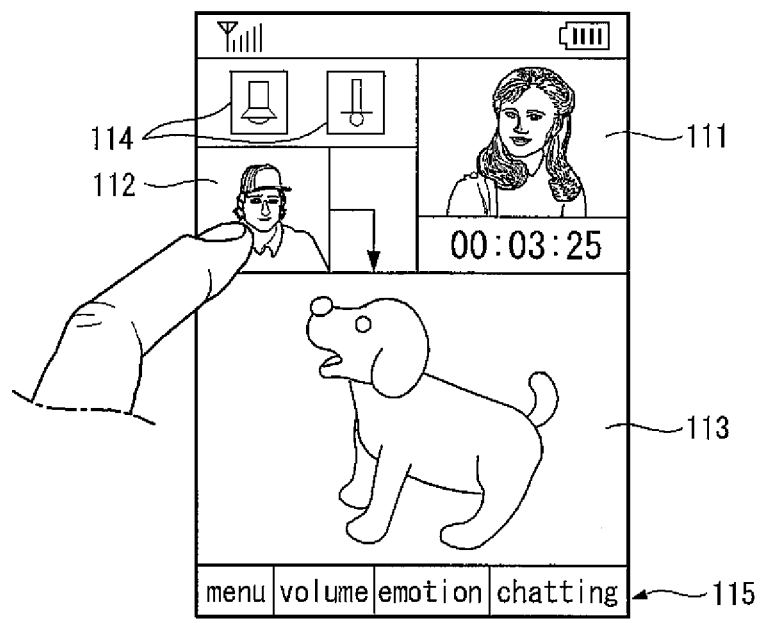

Further, on a screen of FIG. 4d, when the user touches the replacement image 113 displayed in an area in which the user image 112 was displayed, a size of the replacement image is enlarged and a size of the other party image 111 is reduced, as shown in FIG. 4e.

Figure 4F:
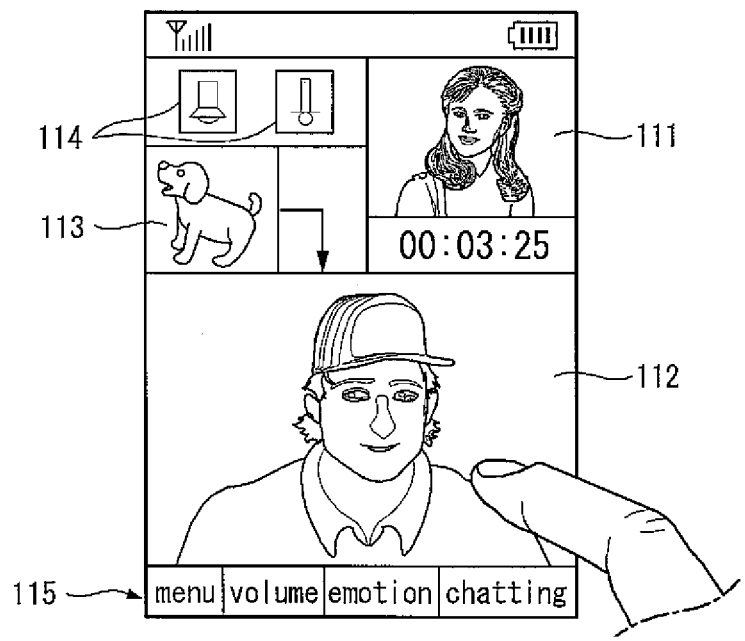

On a screen of FIG. 4e, when the user touches the user image 112, the user image 112 is displayed in an area in which the replacement image 113 was displayed, and the replacement image 113 is displayed in an area in which the user image 112 was displayed, whereby a size and a position of the user image 112 and the replacement image 113 are exchanged and displayed, as shown in FIG. 4f.

Figure 4G:
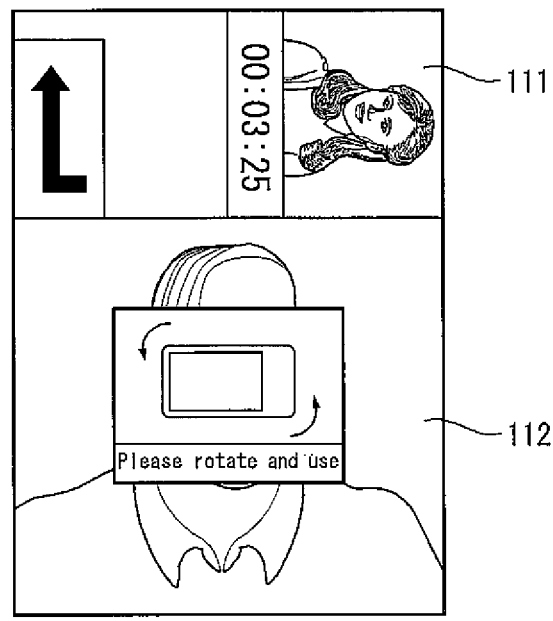

Referring to FIG. 4f, when the user touches the user image 112 displayed to be relatively larger than the other party image 111, while the user image 112 is enlarged, a display form of the touch screen 110 is changed to a full screen display form of a horizontal direction, as shown in FIG. 4g.

Therefore, according to touch input of the user, a size of the user image 112, which is an image of a relatively larger size can be enlarged and a display position and direction can be changed, and a display direction and position or a direction, position, and size of the other party image 111, which is an image of a relatively smaller size can be changed together with the user image 112

Further, in a case of FIG. 4g, referring to FIG. 3b, as described above, as a display direction of the other party image 111 and the user image 112 is changed, a predetermined use guide can be displayed on the touch screen 110 in a pop-up window form so that the user can change a using direction of the mobile communication terminal 10 from a vertical direction to a horizontal direction.

Figure 4H:
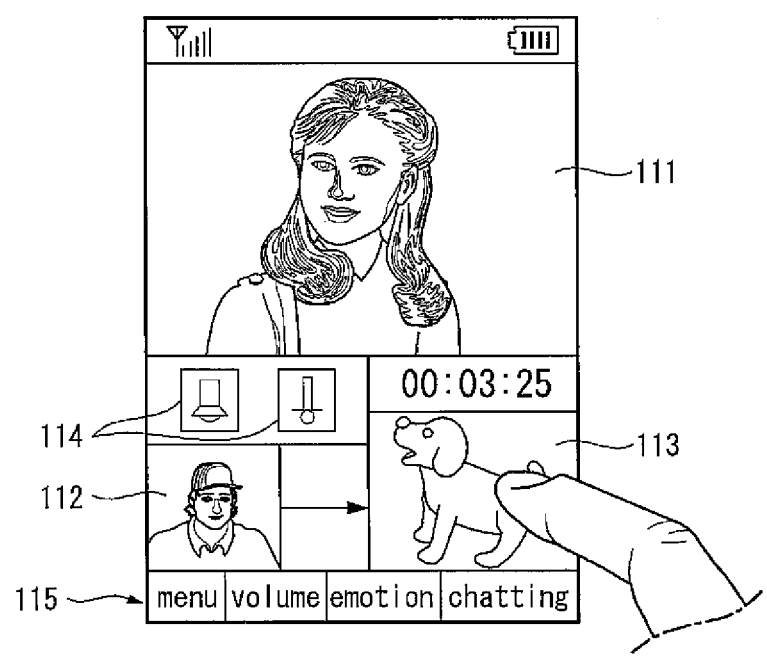

Therefore, the user can perform audiovisual communication while viewing a screen by rotating the mobile communication terminal 10 in a horizontal direction, as shown in FIG. 4h.

FIGS. 5a to 5g are diagrams illustrating a method of controlling a display of a mobile communication terminal in another implementation.

Figure 5A:
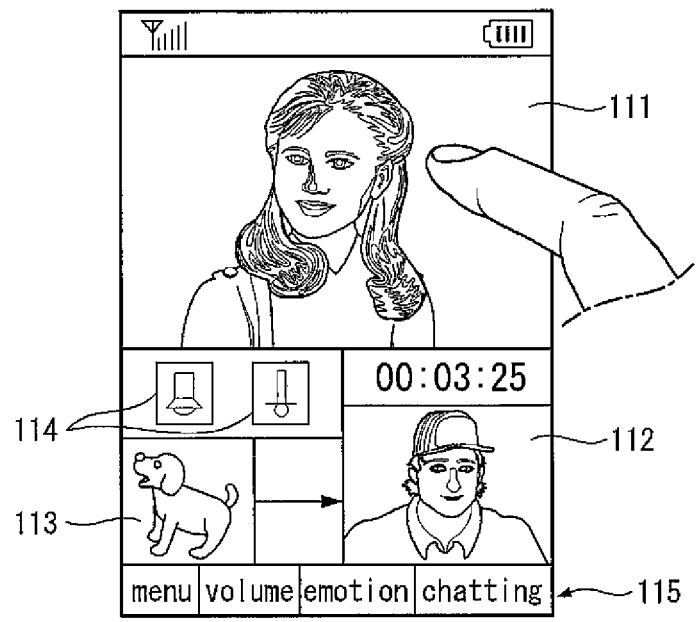
FIGS. 5a to 5g are diagrams illustrating a method of controlling a display of a mobile communication terminal in another implementation.
Figure 5B:
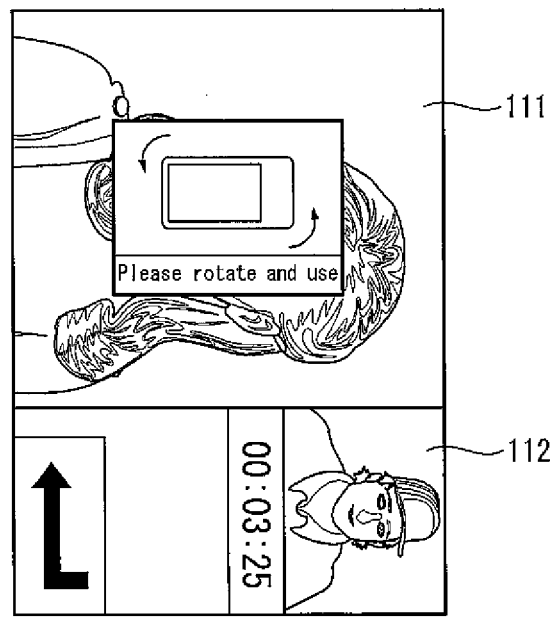

Referring to FIG. 5a, the other party image 111 is displayed to be relatively greater than the user image 112, and in this case, when the user touches the other party image 111, while the other party image 111 is enlarged, a display form of the touch screen 110 is changed to a full screen display form of a horizontal direction, as shown in FIG. 5b.

Further, on the other party image 111 of FIG. 5b, a predetermined use guide is displayed so that the user may change a using direction of the mobile communication terminal 10 from a vertical direction to a horizontal direction. Therefore, the user performs audiovisual communication while viewing a screen by rotating the mobile communication terminal 10 in a horizontal direction, as shown in FIG. 5c.

Figure 5C:
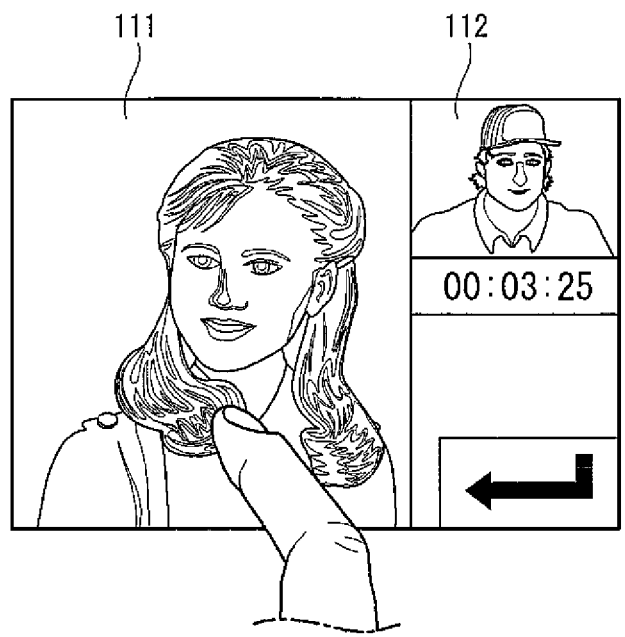

Although not shown, in FIG. 5c, when the other party image 111 is more largely enlarged to occupy a somewhat larger area on the touch screen 110, the user image 112 may be displayed in a Picture-in-picture (PIP) form within the other party image.

Figure 5D:
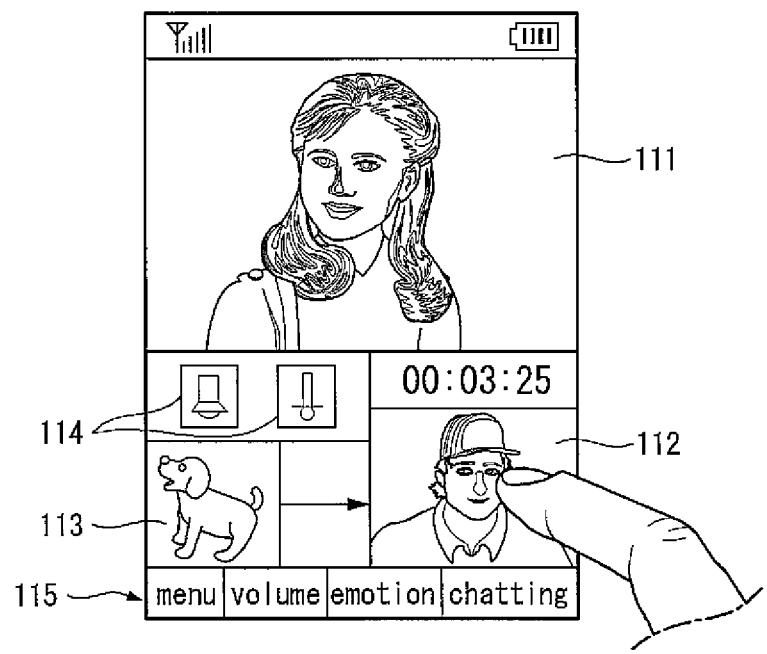

Further, on a screen shown in FIG. 5c, when the user touches the other party image 111 enlarged and displayed to a full screen, while a size of the other party image 111 is reduced, a display direction thereof is changed from a horizontal direction to a vertical direction, so that a display direction and position of the user image 112 are changed together with the other party image 111, as shown in FIG. 5d.

In this case, a rotation use guide for the mobile communication terminal 10 according to a display change can be displayed on the touch screen 110.

Figure 5E:
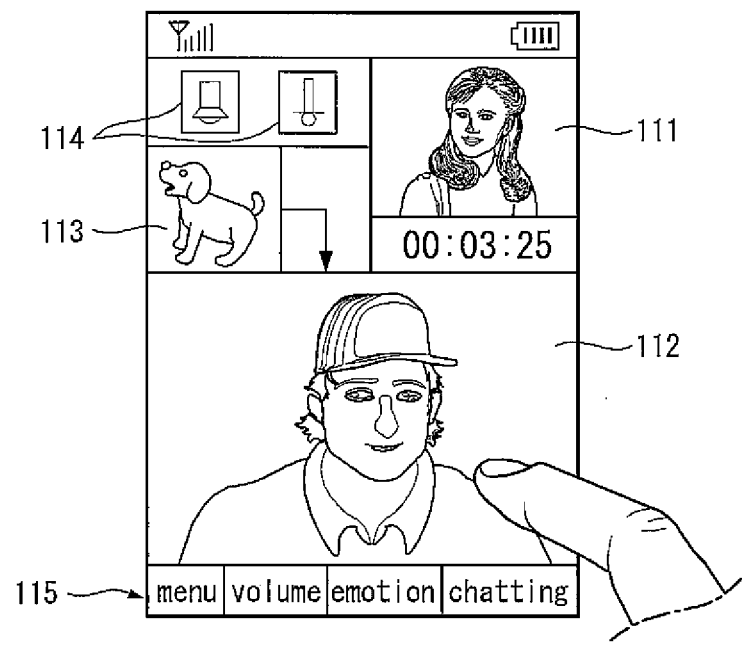
Figure 5F:
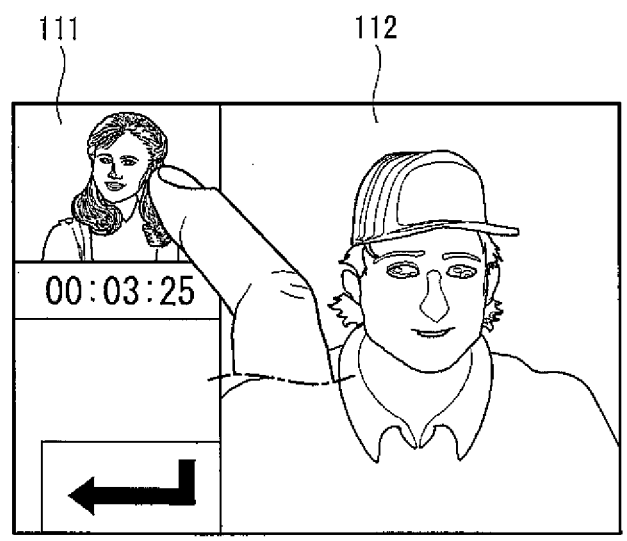
Figure 5G:
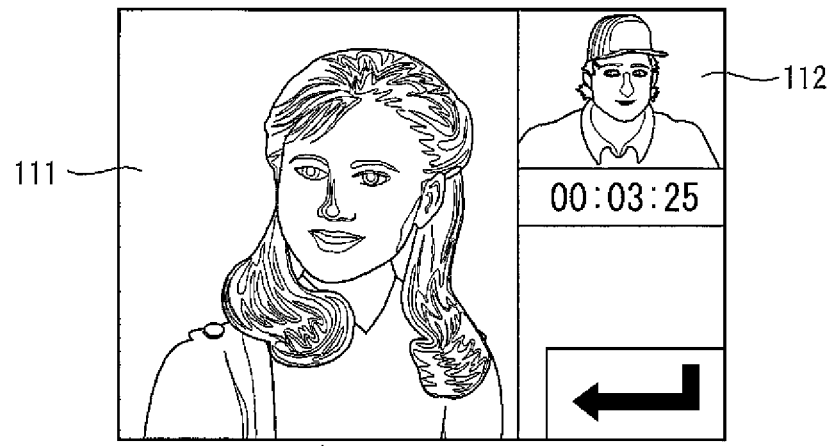

On a screen shown in FIG. 5e, when the user touches the user image 112 displayed to be relatively larger than the other party image 111, while the user image 112 is enlarged and a display direction is changed, a display form of the touch screen 110 is changed to a full screen display form of a horizontal direction, as shown in FIG. 5f.

Further, when the user touches the other party image 111 displayed with a relatively smaller size in a left upper part of the user image 112 on a screen of a full screen display form of a horizontal direction, as shown in FIG. 5f, the other party image 111 is enlarged and displayed by a size of the user image 112, i.e. to a full screen of a horizontal direction, and the user image 112 is reduced to a relatively smaller size and is displayed in a right upper part of the other party image 111, as shown in FIG. 5f. Here, a display position of the other party image 111 and the user image 112 is exemplified and may be changed to another position.

FIGS. 6a to 6e are diagrams illustrating a method of controlling a display of a mobile communication terminal in another implementation.

In this implementation, images are input from one position to another position with a touch and drag method, and a display manner such as a size or a position in which an image is displayed can be changed.

Figure 6A:
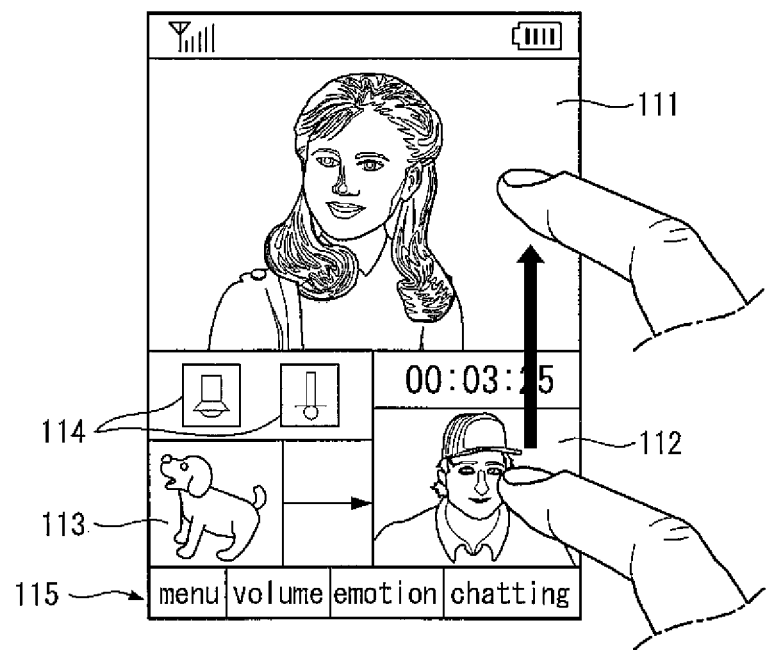
FIGS. 6a to 6e are diagrams illustrating a method of controlling a display of a mobile communication terminal in another implementation.
Figure 6B:
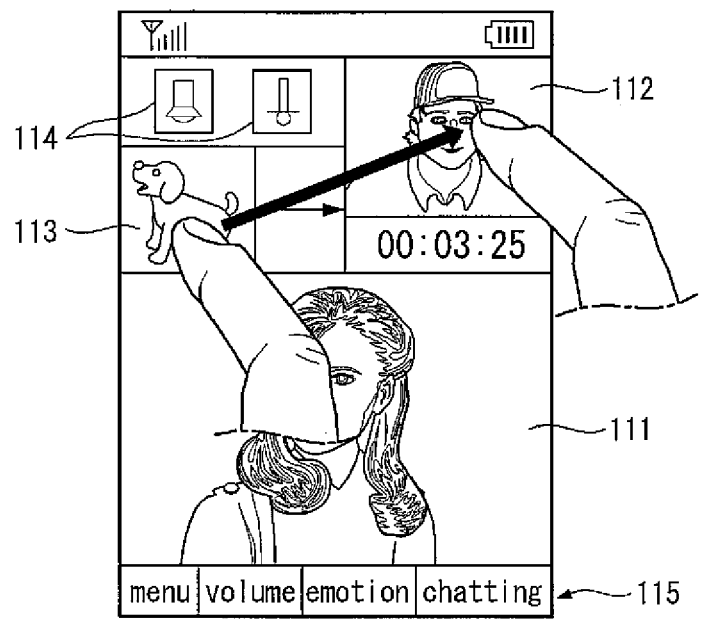

As shown in FIG. 6a, when the user touches the user image 112 and drags the user image 112 up to an area in which the other party image 111 is displayed, positions in which the user image 112 and the other party image 111 are displayed are vertically exchanged and displayed, as shown in FIG. 6b.

Further, as shown in FIG. 6b, when the user touches the replacement image 113 and drags the replacement image 113 up to an area in which the user image 112 is displayed, the replacement image 113, instead of the user image 112 is displayed in an area in which the user image 112 is displayed. The user image 112 is displayed in an area in which the replacement image 113 is displayed. That is, according to touch input such as touch and drag, a position and a size in which images are displayed can be changed. In this case, the controller 120 can transmit the replacement image 113, instead of the user image 112 to another party terminal.

Figure 6C:
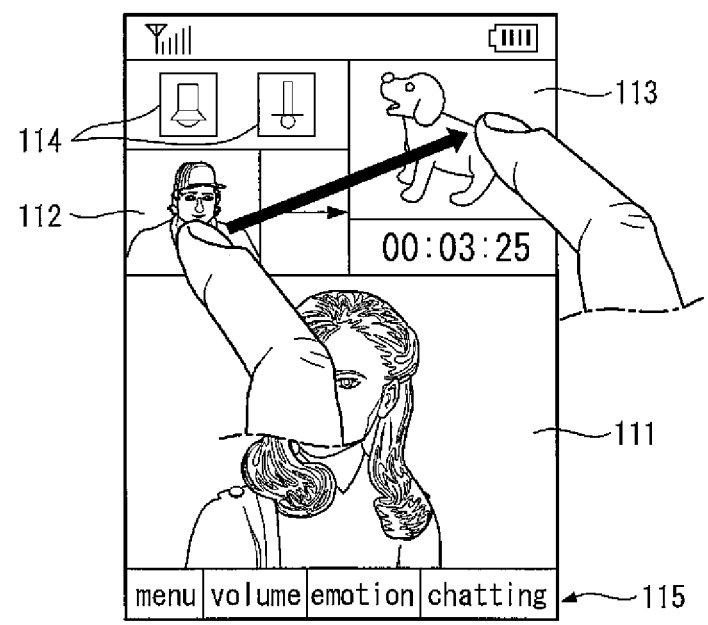
Figure 6D:
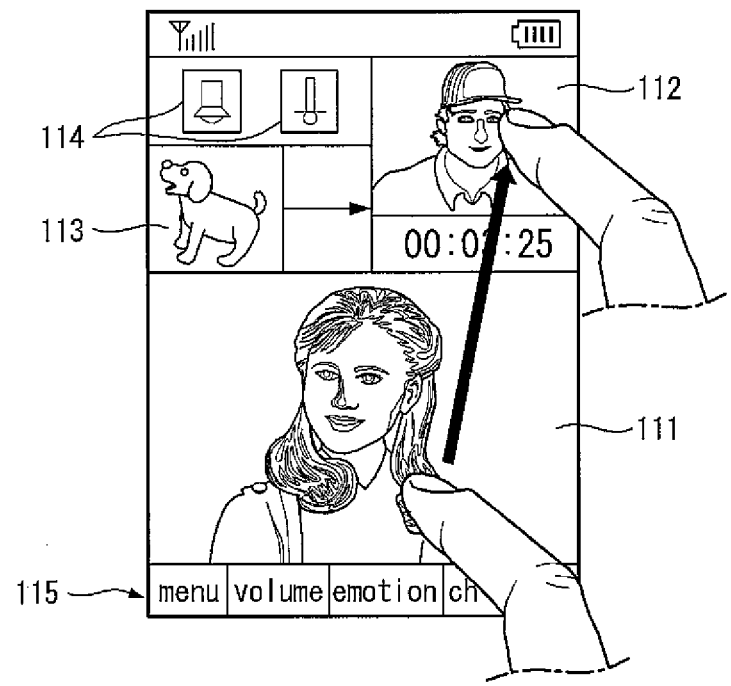

Referring to FIG. 6c, when the user touches the user image 112 and drags the user image 112 up to an area in which the replacement image 113 is displayed, the user image 112 and the replacement image 113 are returned to a previous display state, as shown in FIG. 6d, and the controller 120 can transmit the user image 112, instead of the replacement image 113 to the other party terminal.

Figure 6E:
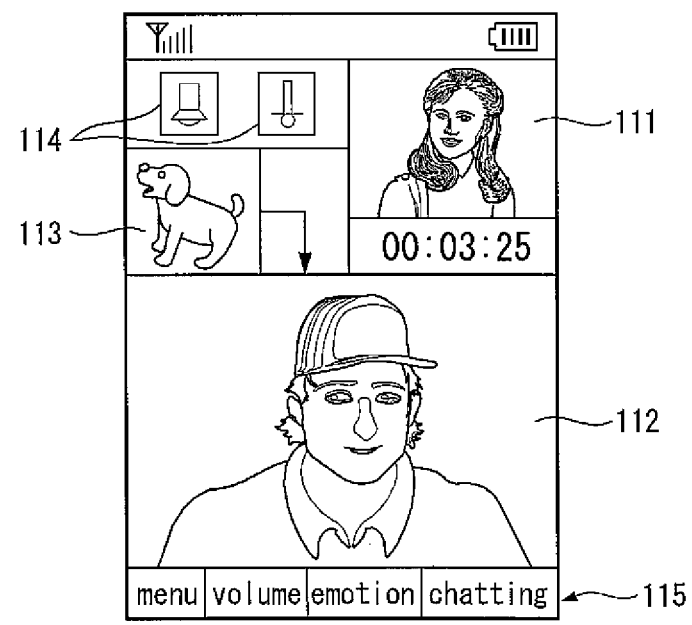

As shown in FIG. 6d, by touching the other party image 111 displayed with a relatively larger size and dragging the other party image 111 up to an area in which the user image 112 of a relatively smaller size is displayed, a size as well as a position in which the user image 112 and the other party image 111 are displayed can be changed at the same time, as shown in FIG. 6e.

FIGS. 7a to 8c are diagrams illustrating a method of controlling a display of the mobile communication terminal in another implementation.

In another implementation of this document, by touching and dragging a specific area of a displayed image, a display manner such as a size of an area in which images are displayed is changed.

Figure 7A:
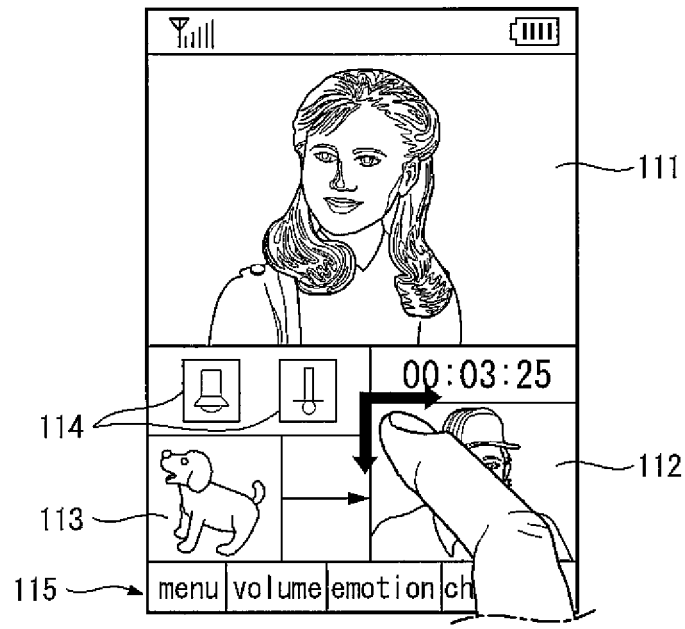
FIGS. 7a to 7c are diagrams illustrating a method of controlling a display of a mobile communication terminal in another implementation.
Figure 7B:
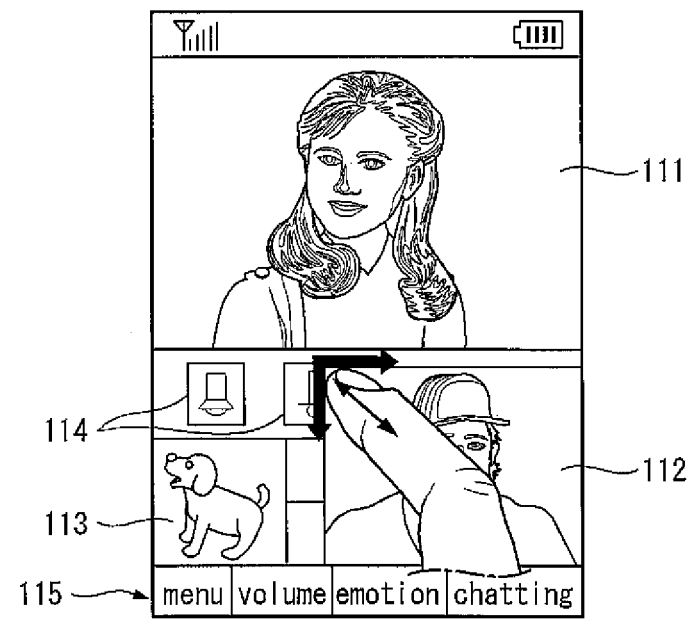
Figure 7C:
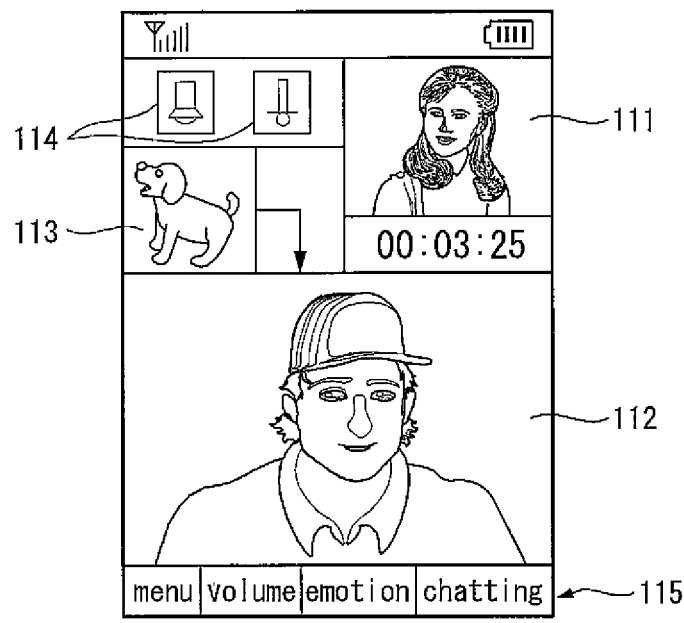

On a screen shown in FIG. 7a, when the user touches the user image 112, for example an area around a left upper corner thereof and drags the user image 112 in a left upper direction, which is a diagonal direction, as shown in FIG. 7b, a size of the user image 112 is enlarged, and a display manner is changed while reducing a size of the other party image 111 to be not overlapped with the enlarged user image 112, whereby the screen is changed to a screen shown in FIG. 7c.

Figure 8A:
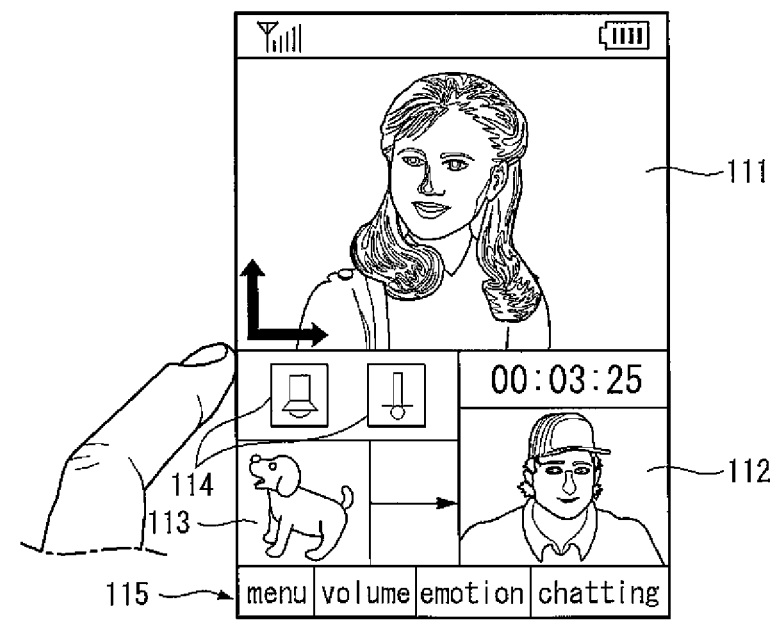
FIGS. 8a to 8c are diagrams illustrating a method of controlling a display of a mobile communication terminal in another implementation.
Figure 8B:
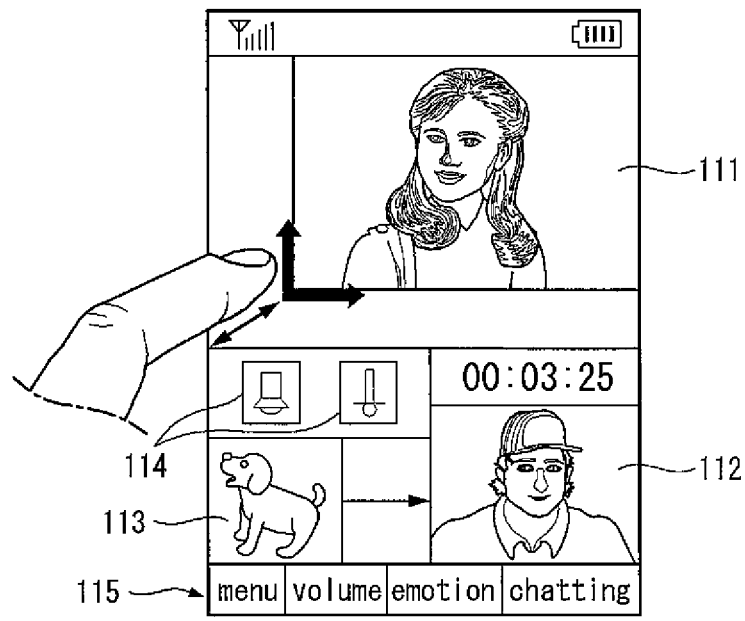
Figure 8C:
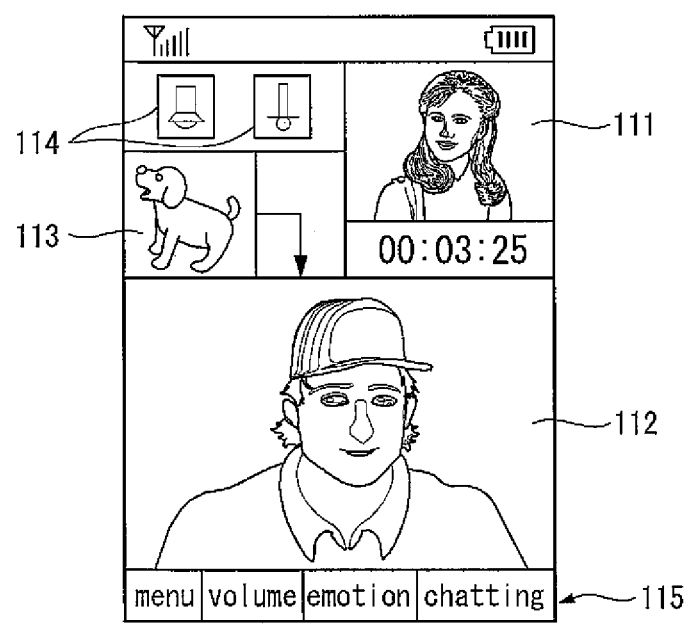

Further, on a screen shown in FIG. 8a, when the user touches the other party image 111, for example an area around a left lower corner thereof and drags the other party image 111 in a right upper direction, which is a diagonal direction, as shown in FIG. 8b, a size of the user image 112 is reduced, whereby a display manner is changed while a size of the user image 112 is enlarged by utilizing the remaining space to the maximum, so that the screen is finally changed to a screen shown in FIG. 8c when a drag is stopped.

Figure 9A:
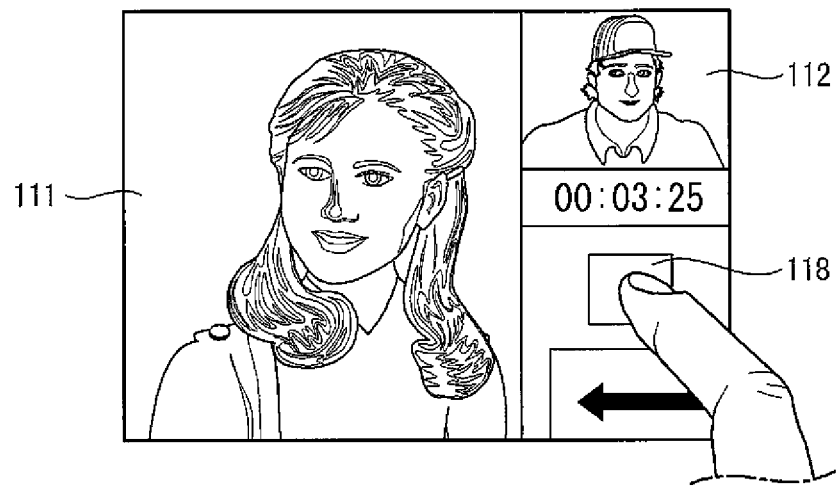
FIGS. 9a to 9c are diagrams illustrating a method of controlling a display of a mobile communication terminal in another implementation.
Figure 9B:
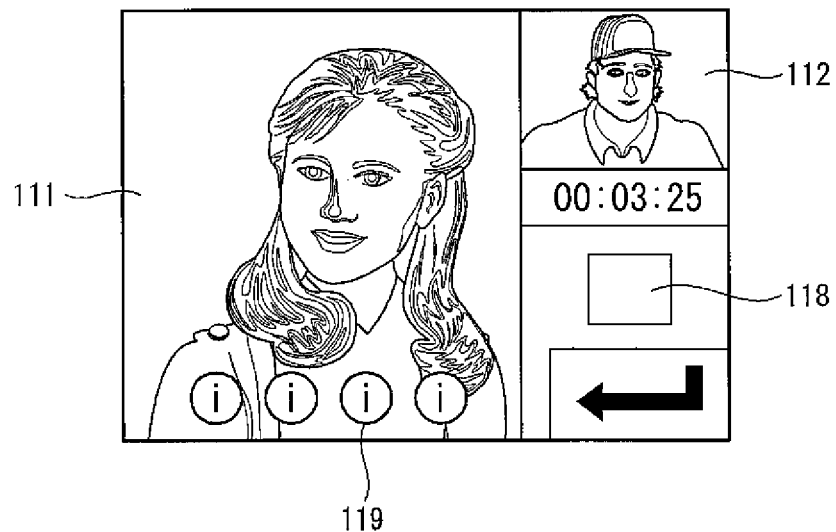
Figure 9C:
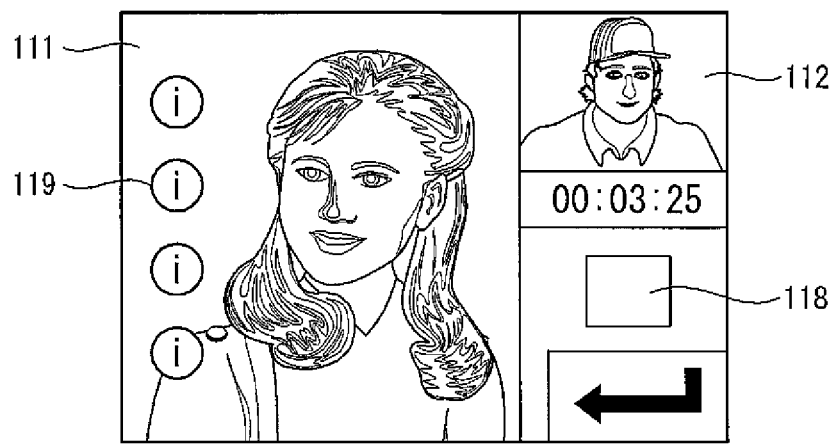

FIGS. 9a to 9c are diagrams illustrating a method of controlling a display of a mobile communication terminal in another implementation.

FIG. 9*a* illustrates an example in which the touch screen 110 is displayed with a full viewing screen of a horizontal direction as the other party image 111 is enlarged.

Referring to FIG. 9*a*, on the full viewing screen of a horizontal direction of the mobile communication terminal 10, the other party image 111, the user image 112, call duration time information, and an icon for returning to a previous screen are provided, and a menu viewing button or icon 118 may be further provided.

Therefore, when the user touches the menu viewing button or icon 118, according to the display of a full viewing screen, information, such as an icon or a soft key 119 for selecting a menu, omitted to secure an area for displaying the other party image 111 to the maximum is displayed in a predetermined area on a screen such as a specific area of the other party image 111, as shown in FIGS. 9*b* and 9*c*.

In each of the above embodiments, other functions may occur when the image is touched and enlarged. For example, information about the person corresponding to the touched image may be displayed (e.g., phone number, email address, postal address, birth date, or other biographical data). Also, a sound may be generated such as a ring, buzz or a recording of a person's voice announcing the name of the person corresponding to the touched image. Similarly, a vibration or other tactile feedback may be generated when the image is touched and enlarged.

Also, in the preceding embodiments, the touched and rearranged images are described as relating to individuals. However, the touched and rearranged images may also relate to business or government establishments.

In implementations of this document, when performing audiovisual communication in a mobile communication terminal, a display can be controlled conveniently, rapidly, and efficiently, as needed using characteristics of a touch screen.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller.

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Other features will be apparent from the description and drawings, and from the claims.

What is claimed is:

1. A mobile communication terminal, comprising:
   a communication module configured to transmit and receive data to perform a video call with at least one other party's terminal;
   a camera module;
   a touch screen operatively connected to the camera module and configured to display images including a first image received from the at least one other party's terminal and a second image acquired from the camera module; and
   a controller operatively connected to the touch screen and configured to
      control the touch screen to change a display manner of the first image and/or the second image in response to a touch input to one of the first and second images displayed on the touch screen, and
      control the touch screen to change a display direction of the touched image if the touched image is larger than the untouched reduced image,
   wherein the display manner comprises at least one of a display position, size, and direction.

2. The mobile communication terminal of claim 1, wherein the changed display direction is a direction rotated by 90° clockwise or counterclockwise.

3. The mobile communication terminal of claim 1, wherein the controller is configured to control the touch screen to enlarge the touched image such that at least one of a horizontal edge and a vertical edge of the touched image agrees with a length or a width of the touch screen according to the direction change.

4. The mobile communication terminal of claim 3, wherein the controller is configured to control the touch screen to reduce the size of the untouched reduced image not to overlap the enlarged touched image.

5. The mobile communication terminal of claim 3, wherein the controller is configured to control the touch screen to display the untouched reduced image as a Picture In Picture (PIP) within the enlarged touched image.

6. The mobile communication terminal of claim 3, wherein the controller is configured to control the touch screen
   to display a menu key including at least one icon to execute specific functions on the touch screen such that the menu key is not overlapped with the enlarged touched image, and
   to display the at least one icon such that the at least one icon is overlapped with a part of the enlarged touched image if the menu key is touched.

7. The mobile communication terminal of claim 3, wherein the controller is configured to control the touch screen to return the touched image and the untouched reduced image to a previous display state if the enlarged touched image is further touched.

8. The mobile communication terminal of claim 7, wherein the controller is configured to control the touch screen to display on the touch screen a third image stored in the mobile communication terminal, and to replace the untouched reduced image with the third image if the third image is touched.

9. The mobile communication terminal of claim 8, wherein the controller is configured to control the touch screen to change at least one of a display position, size, and direction of the enlarged touched image with a corresponding one of a display position, size, and direction of the third image if the replaced third image is touched.

10. The mobile communication terminal of claim 8, wherein the controller is configured to control the touch screen to display the untouched reduced image in a position in which the replaced third image was previously displayed if the replaced third image is touched.

11. The mobile communication terminal of claim 10, wherein the controller is configured to control the touch screen to return the untouched reduced image and third image to a previous display state if the untouched reduced image displayed in the previous display position of the third image is touched.

12. The mobile communication terminal of claim 3, wherein the controller is configured to control the touch screen to display a menu key for turning back the enlarged touched image and the untouched reduced image into a previous display state upon touching of the menu key, wherein the menu key is displayed not to be overlapped with the enlarged touched image.

13. The mobile communication terminal of claim 1, wherein the controller is configured to control the touch screen to display on the touch screen a display orientation icon configured to enable a user to rotate the display.

14. A method of controlling a display for a video call with at least one other party's terminal in a mobile communication terminal comprising a touch screen and a camera module, the method comprising:
    displaying images on the touch screen, including
        displaying a first image received from the at least one other party's terminal, and
        displaying a second image acquired from the camera module; and
    controlling the touch screen to change a display manner of the first image and the second image in response to a touch input to one of the first and second images,
    wherein the display manner is at least one of a display position, size and direction of the first and second image, and
    wherein the step of controlling the touch screen comprises:
        changing a display direction of the touched image if the touched image is larger than the untouched reduced image.

15. The method of claim 14, wherein the step of changing a display direction comprises:
    rotating the display direction 90° clockwise or counter-clockwise.

16. The method of claim 14, wherein the step of controlling the touch screen comprises:
    enlarging the touched image such that at least one of a horizontal edge and a vertical edge agrees with a length or a width of the touch screen.

17. The method of claim 16, wherein the step of enlarging comprises:
    preventing the untouched reduced image from overlapping the enlarged touched image.

18. The method of claim 16, wherein the untouched reduced image is displayed as a PIP within the enlarged touched image.

19. The method of claim 16, further comprising:
    displaying a menu key for displaying at least one icon to execute specific functions on the touch screen without overlapping the menu key with the enlarged touched image; and
    displaying the at least one icon overlapped with a part of the enlarged and displayed image if the menu key is touched.

20. The method of claim 16, further comprising:
    returning the enlarged touched image and the untouched reduced image to a previous display state if the enlarged touched image is further touched.

21. The method of claim 20, further comprising:
    displaying a third image stored in the mobile communication terminal; and
    replacing the untouched reduced image with the third image if the third image is touched.

22. The method of claim 21, further comprising:
    changing at least one of a display position, size, and direction of the first image to a corresponding one of a display position, size, and direction of the third image if the replaced third image is touched.

23. The method of claim 21, wherein the step of replacing comprises:
    displaying the untouched reduced image in a position in which the third image was previously displayed.

24. The method of claim 23, further comprising:
    returning the exchanged untouched reduced image and third image to a previous display state when the untouched reduced image displayed in the previous position of the third image is touched.

25. The method of claim 16, further comprising:
    displaying a menu key for turning back the enlarged touched image and the untouched reduced image to a previous display state, wherein the menu key is not overlapped with the enlarged touched image.

26. The method of claim 14, further comprising:
    displaying on the touch screen a display orientation icon configured to enable a user to rotate the display.

* * * * *